United States Patent [19]

Houskamp

[11] Patent Number: 4,656,406

[45] Date of Patent: Apr. 7, 1987

[54] ELECTRIC FIELD GUIDANCE SYSTEM FOR AUTOMATED VEHICLES

[75] Inventor: Robert W. Houskamp, Grand Rapids, Mich.

[73] Assignee: Litton Automation Systems, Inc., Zeeland, Mich.

[21] Appl. No.: 778,523

[22] Filed: Sep. 20, 1985

[51] Int. Cl.$^4$ ............................................. G05D 1/00
[52] U.S. Cl. ..................................... 318/587; 180/167
[58] Field of Search ................ 318/587; 180/168, 167; 364/424

[56] References Cited

U.S. PATENT DOCUMENTS

| | | | |
|---|---|---|---|
| 3,942,087 | 3/1976 | Maisch et al. | 318/587 |
| 4,020,918 | 5/1977 | Houskamp et al. | 180/168 |
| 4,034,823 | 7/1977 | Housekamp et al. | 180/168 X |
| 4,310,789 | 1/1982 | Mank et al. | 318/587 |
| 4,576,246 | 3/1986 | Stieber et al. | 318/587 X |

Primary Examiner—Benjamin Dobeck
Attorney, Agent, or Firm—Varnum, Riddering, Schmidt & Howlett

[57] ABSTRACT

An automated vehicle guidance system (100) includes automated self-propelled vehicles (102) selectively traveling a guidepath (114) comprising a plurality of interconnected guidelines (110, 116, 118). The guidepath (114) comprises an electric field wire system comprising a series of wire segments buried under a floor surface (112), and excited by an alternating current (AC) voltage source (210) referenced to earth ground. Voltage probes (222, 224) sense the electric field emanating from the guidepath segments and generate an intelligence signal for appropriately steering the vehicle (102) along the guidepath (114).

8 Claims, 13 Drawing Figures

ELECTRIC FIELD GUIDANCE SYSTEM FOR AUTOMATED VEHICLES

TECHNICAL FIELD

The invention relates to automated vehicle guidance systems and, more particularly relates to arrrangements for controlling automatically guided vehicles through sensing arrangements adapted to detect electrostatic signals generated from a guide path which the vehicles are adapted to follow.

BACKGROUND OF THE INVENTION

Automated vehicles and guidance systems associated therewith have been commercially developed whereby the vehicles effectively "track" a predetermined guidepath comprising either guide lines on a floor surface or guide wires buried under a floor surface. Exemplary vehicles and guidance systems are disclosed in commonly assigned U.S. Pat. Nos. 3,935,922; 3,970,840; and 4,003,445. The vehicles disclosed in these patents can be adapted for specific uses such as floor maintenance, mail delivery, and similar functions routinely performed within industrial and commercial organizations.

In the commonly-assigned Hainsworth, et al, U.S. Pat. No. 4,379,497 issued Apr. 12, 1983, a vehicle collision avoidance system comprises unmanned vehicles which are made to follow a predetermined guidepath, wherein the guidepath comprises fluorescent markings on the path surface. The vehicles employ light detection systems to maintain alignment along the path. Automatically guided vehicles which can be programmed to follow a predetermined course responsive to coded instructions on the floor surface are also well known. For example, DeLiban, U.S. Pat. No. 3,147,817 issued Sept. 8, 1964; Paulus et al, U.S. Pat. No. 2,317,400 issued Apr. 17, 1943; and Kohls, U.S. Pat. No. 3,411,603 issued Nov. 19, 1968. Each of these systems employs a buried wire type guide path. Another type of system for providing automatically guided vehicles utilizing buried wires is shown in the DeLiban et al, U.S. Pat. No. 4,284,160.

Automatically guided vehicles using reflected light and photo cells to detect the position of a reflected light guideline are disclosed in the Vischulius, U.S. Pat. No. 3,718,821 issued Feb. 27, 1973; Kudo, U.S. Pat. No. 3,738,433 issued June 12, 1973; Ando, et al, U.S. Pat. No. 3,881,561 issued May 6, 1975; and Wesener, U.S. Pat. No. 3,628,624 issued Dec. 21, 1971.

The general art of providing automatically guided vehicles following predetermined guidepaths employing buried wire systems or similar types of guidepaths has been relatively established for nearly two decades. In their simplest form, buried wire guidance systems pass electric currents through the guide wires which the vehicles are adapted to follow. The guided vehicles are made to follow these paths by incorporating various electrical components on the vehicles such as magnetic field sensing detectors. For example, the sensing detectors can include components having inductive elements in the form of an inverted "V" on the vehicle. The relative output of two inductive components comprising the legs of the inverted "V" can be used to provide a guidepath error signal to the vehicle's steering system. Electric circuits on the vehicle can utilize the error signal to maintain the vehicle on the path. The concepts of automatically-guided vehicles having traffic paths defined by conductors energized so as to generate a substantial magnetic field, and also showing sensors on the vehicles to detect the magnetic fields and control steering are disclosed in U.S. Pat. Nos. 3,009,525 and 3,147,817. A system specifically showing a pair of sensing coils mounted on an automatically-guided vehicle and a system comprising an AC current-carrying conductor, wherein the magnetic field induces a voltage in the coils, is shown in the Ballantyne, U.S. Pat. No. 3,598,196.issued Aug. 10, 1971.

When the guidepath includes multiple paths, the vehicle can be made to differentiate between paths by having different frequencies of current generated through the various paths. Through conventional electrical circuitry on the vehicles, the vehicles can then be made to follow only currents of particular frequencies. Specifically, the means by which the vehicles can be maneuvered through the guidepath network can be either by switching a single frequency to which a vehicle responds onto one of several intersecting guide wires, or by otherwise exciting the several guide wires continuously and alerting the vehicle to change the frequency to which it is responsive. In the latter case, it is apparent that the vehicle will have substantially more sophisticated "intelligence" than in the former case, the intelligence being in the form of programming control or the like. Systems disclosing the concept of an automatically guided vehicle being responsive to a particular frequency and systems employing a guide path wherein each of the guide wires is energized at a different frequency are shown in the Hosking, et al, U.S. Pat. No. 3,039,554, and the Waites, U.S. Pat. No. 4,010,409 issued March 1, 1977. The Waites patent describes a frequency selective vehicle guidance system wherein the vehicle frequency discrimination circuitry uses phase-locked loop and other conventional circuits to provide signals representative of deviation from a guidance cable carrying a particular frequency.

Systems as described above can be characterized as "buried magnetic-field" systems. These buried magnetic-field systems have many advantages, including relative simplicity and relative "ruggedness" in various types of industrial environments. However, several problems also exist with respect to such systems. For example, it is possible that wire breakage can occur at flexing floor sections, such as expansion joints and floor cracks. Because of the necessity for a low ohmic resistance in the wire, such wires must typically be of a solid or stranded metal construction. Solid or stranded metal wires are relatively unbendable and not readily stretched so as to accommodate flexion.

In addition, such wires are often subject to corrosive chemicals, especially when such vehicle guidance systems are employed in industrial environments. In fact, some of these corrosive chemicals can actually be within the floor material itself. Still further, in vehicle guidance systems wherein the magnetic field generated by a current flowing through the wires is detected by the vehicles, each guide path wire segment must be a closed current loop, with the current adjusted so as to be between certain predetermined values. In multiple path systems, the requisite wire layout can be extremely complex, and can require a substantial amount of additional wire length which is not actually used for guidance.

Also, as shown by the prior art, known guidance systems having multiple guidepaths typically require current generation at several different frequencies. In a relatively complicated guidepath network, the requirement of multiple frequency generation can result in substantial difficulty in arranging a wire network in which the individual wire guidepaths can be distinguished from each other.

SUMMARY OF THE INVENTION

In accordance with the invention, an automated vehicle guidance system includes one or more self-propelled vehicles adapted to follow a predetermined guidepath. The guidepath includes path signal generating means for generating signals on the guide-path, and each of the vehicles includes guidepath sensing means for sensing the position of a guidepath with respect to the vehicle. Signal generating means on the vehicle are connected to the sensing means for generating an intelligent signal representative of the position of the vehicle with respect to the guidepath. Control means are provided on the vehicle so as to steer the vehicle responsive to the intelligence signal and maintain a given position of the vehicle with respect to the guidepath as the vehicle moves along the guidepath.

Further in accordance with the invention, the path signal generating means includes means for exciting the guidepath with an AC voltage signal referenced to an earth ground. The guidepath sensing means includes electric field sensing means for sensing the strength of the electric field resulting from the voltage signal. The signal generating means is connected to the electric field sensing means and is responsive to the sensed strength of the electric field for generating the intelligence signal.

The path signal generating means includes an AC voltage source having one terminal connected to an earth ground. Another terminal of the voltage source is connected to a conductor of the guidepath. The AC voltage source and the conductor form a closed-loop electrical path only through capacitive coupling to the earth ground.

The guidepath sensing means includes a pair of voltage probes mounted in the vehicle so that the relative strength of the electric field sensed by one of the probes substantially differs from the relative strength of the electric field sensed by the other probe only when the vehicle deviates from the given position with respect to the guidepath. In addition, the guidepath sensing means includes means for providing capacitance between the voltage probes and the earth ground. The vehicle includes a base having a relatively large conductive surface, and the surface provides the capacitance.

The signal generating means includes means connected to the voltage probes for generating the intelligence signal as representative of the difference between signal strengths of the electric field as sensed by the voltage probes. The signal generating means includes means to provide synchronous detection and automatic gain control of signals generated by the voltage probe and the steering error signal.

BRIEF DESCRIPTION OF THE DRAWINGS

The invention will now be described with reference to the accompanying drawings in which.

DETAILED DESCRIPTION

Figure 1:
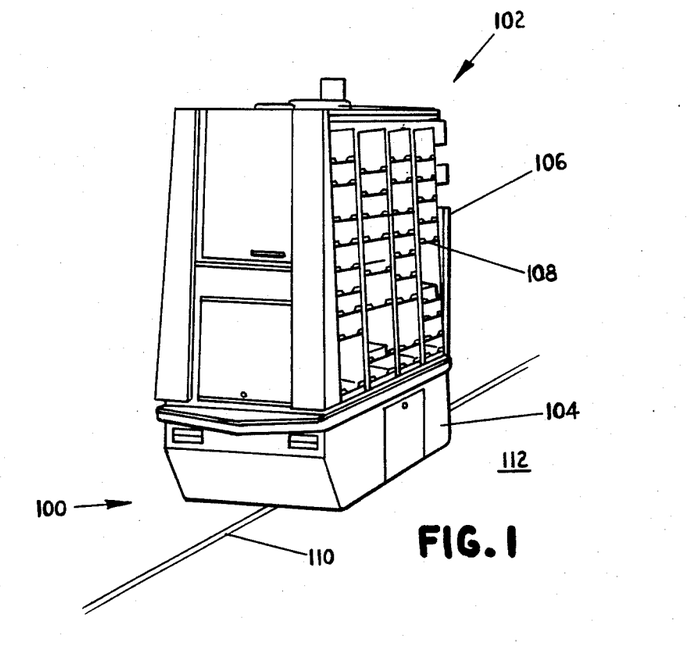
FIG. 1 is a perspective view of an automatically guided vehicle of the vehicle guidance system in accordance with the invention.

The principles of the invention are disclosed, by way of example, in an automated self-propelled vehicle guidance system 100 as partially shown in FIG. 1. A system of this type can be utilized for performing functions such as transportation of materials between various locations of an industrial plant. The vehicle guidance system 100 includes an automatically controlled guided vehicle 102 having a base 104 and an upper cabinet 106. A plurality of shelves 108 are provided in the cabinet 106 to receive tote boxes mail, or other similar articles. A wire guideline 110 is provided as a buried wire beneath the floor surface 112.

Figure 2:
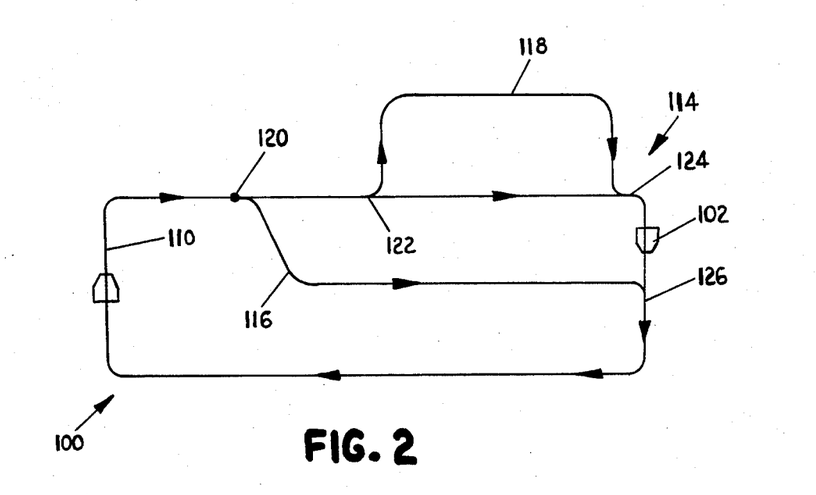
FIG. 2 depicts an exemplary guidepath layout for a vehicle guidance system in accordance with the invention.

The wire guideline 110 is part of a wire guidepath 114 as shown in FIG. 2. The wire guidepath 114 can be located beneath a floor surface and disposed throughout the industrial plant or other facility as necessitated by the particular transport functions required. The guidepath 114 can comprise a plurality of interconnected guidelines 110, 116 and 118, having intersection locations 120, 122, 124 and 126 as shown in FIG. 2. As subsequently described herein, the automatically control vehicles 102 can be made to selectively follow the guidepath 114 as dependent on the functions to be performed. For purposes of descriptive understanding, it will be assumed that vehicle travel along the guidelines 110, 116 and 118 is unidirectional as indicated by the arrows in FIG. 2. However, bidirectional travel along the guidepath 114 is clearly within the scope of the invention.

Figure 3:
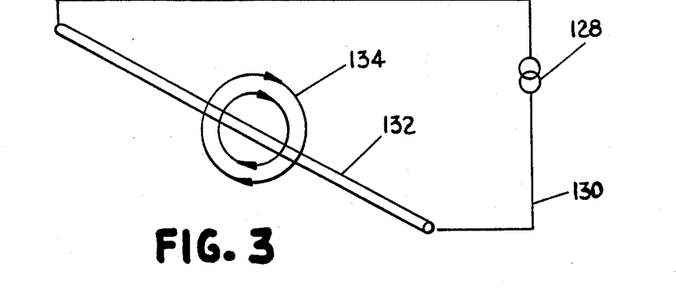
FIG. 3 depicts general principles associated with the magnetic field generated through the passage of an electric current through a conductor.

In order to illustrate the differences between a buried magnetic field wire guidance system and a buried electric field wire guidance system in accordance with the invention, it is necessary to generally discuss basic physics principles associated with each. Referring to FIG. 3, there is shown the concept of the generation of a magnetic field by the existence of a current in a conductor. As depicted therein, a voltage source 128 is connected through lines 130 so as to impress a voltage on current-carrying conductor 132. The current-carrying conductor 132 can be characterized as a resistance wire 132 or similar component. With the voltage source being a direct-current (DC) source, the current flowing through conductor 132 is unidirectional. However, as has been known for centuries, a DC current will produce magnetic lines of force shown as lines of force 134 in FIG. 3 generated around the conductor. Also, an AC current is known to produce magnetic lines of force alternating in their direction around a conductor.

Figure 4:
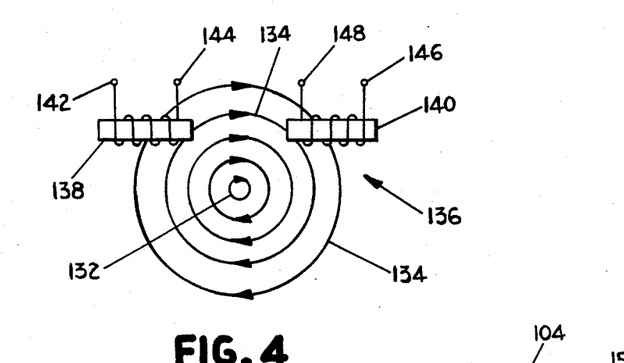
FIG. 4 is a simplified block diagram of a pair of magnetic field ratiometric detectors.

In their simplest form, known vehicle guidance systems employing a buried magnetic-field system as described in the section entitled "Background of the Invention" can comprise a wire positioned within a floor surface and through which an AC current is passed. As shown in schematic form in FIG. 4, an automatically guided vehicle can include a magnetic-field detector system 136 comprising a pair of electric current detectors designated in FIG. 4 as first detector 138 and second detector 140. As shown in FIG. 4, the detectors 138 and 140 can be in the form of sensing coils arranged opposite each other in positions on the vehicle (not shown) so that the first and second detectors 138 and 140 are electrically equivalent relative to a buried wire conductor 132 when the vehicle is traversing the guidepath comprising conductor 132 exactly in a desired position. Alternatively, it is possible for the sensing coils comprising the first and second detectors 138, 140 to be in the form of an inverted "V" as positioned on the automatically-guided vehicle and situated above the conductor 132. For purposes of further description, the first and second detectors 138, 140 are shown as having terminals 142, 144 and 146, 148, respectively.

Figure 5:
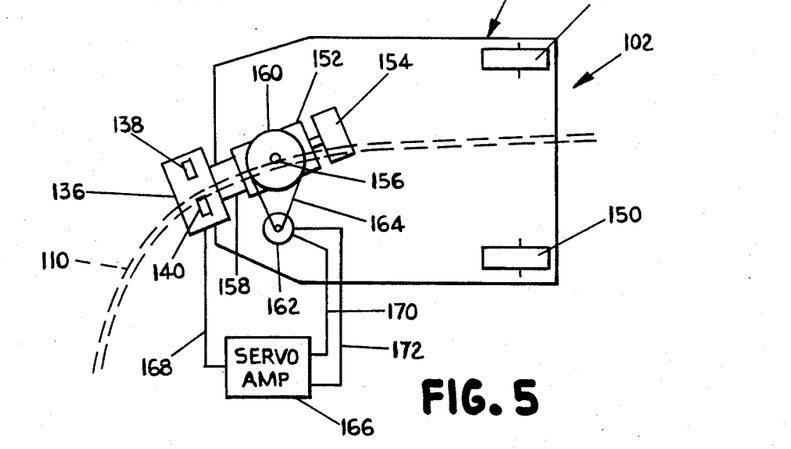
FIG. 5 is a schematic block diagram of a plan view of the vehicle shown in FIG. 1, illustrating an exemplary servo mechanism for the drive wheel.

Referring now to FIG. 5, there is shown an exemplary block diagram of a steering arrangement for the vehicle 102. Specifically, the vehicle base 104 is shown as having rear wheels 150 and a front traction, steerable wheel 152. A drive motor 154 is connected to the wheel 152 in conventional fashion, for example with the use of a chain (not shown) to drive the wheel 152. The steerable wheel 152 is mounted on a pivot pin 156 about which the wheel is free to rotate. The detector system 136 comprising first and second detectors 138, 140 is mounted to the pivotable mounting mechanism for the wheel 152 through a suitable frame 158. Thus, the detector system 136 is pivotably movable along with the wheel 152, so if the unit is maintained over the center of the conductor guideline 110, the wheel 152 is continuously placed in a direction whereby the vehicle will follow the guideline 110. A sprocket 160 is mounted on the pivot pin 156 for the steerable wheel 152 and is connected to a reversible steering motor 162 at the drive train 164. A servo amplifier 166 is connected to the detector system 136 through lead 168 and includes output leads 170, 172 connected to the steering motor 162.

Figure 6:
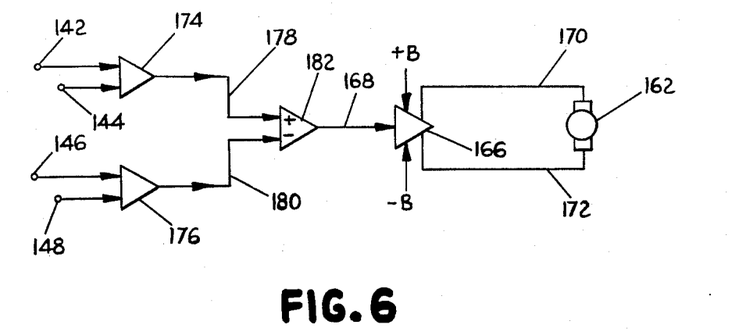
FIG. 6 is a block diagram of an exemplary circuit layout for generating a steering error signal from signals representative of the deviation of the vehicle from the guide path.

In operation, and as shown in FIG. 6, the detector system 136 comprising the first and second detectors 138, 140 detects the position of the vehicle with respect to the guideline 110, with current signals produced at terminals 142, 144 and 146, 148. The current signals are applied to operational amplifiers 174 and 176 so as to convert the current signals into corresponding voltage signals having a reference to ground. The voltage signals are applied on leads 178 and 180 to a differential amplifier in a manner so as to generate a guidepath error signal on lead 168. This error signal represents the relative signal strengths of the current signals existing at first and second detectors 138, 140. The signals are affected by the magnetic lines of force 134 which exist around the current-carrying conductor 132.

The guidepath error signal on lead 168 is then applied through the servo amplifier 166 so as to produce an intelligence signal having a polarity related to any lateral deviation of the detector system 136 from the guideline 110. This output signal from the servo amplifier 166 is applied on output leads 170 and 172 to the steering motor 162 so as to rotate the wheel 152 either clockwise or counter-clockwise as shown in FIG. 5, depending on the deviation of the detector system 136 from the guideline 110. To this end, the steering motor 162 rotates the sprocket 160 through drive chain 162 to thereby rotate the steering wheel 152 about the pivot pin 156. In this manner, the output current of first detector 138 relative to the output current of second detector 140 is used to provide a guidepath error signal to the vehicle's steering mechanism. The resulting system thus provides a means by which the vehicle is automatically guided along a path predetermined by the placement of the conducting wire. For this reason, such systems are typically referred to as "automatically guided vehicles" (AGV's). As previously described, the aforedescribed system can also comprise means for maneuvering the vehicle through the guidepath network by such means as providing the switching of a single frequency to which the vehicle responds onto one of several wire segments of the guidepath, or by exciting the several wire segments of the guidepath continuously and alerting in some manner the vehicle to "change" the frequency to which it is responsive.

A buried magnetic-field guidance system has many advantages among them its simplicity and ruggedness in industrial environments. However, as discussed in the section entitled "Background of the Invention", several inherent problems also exist with such systems. Among these inherent problems are wire breakage and wire corrosion. In addition, the guidepath wire segments must comprise closed current loops, with the current adjusted to be between certain stated values. Further, in guidance systems employing several different frequencies in multiple segment layouts, there can be substantial difficulty arranging a wire network in which the individual wire guidepaths can be distinguished from each other.

Figure 7:
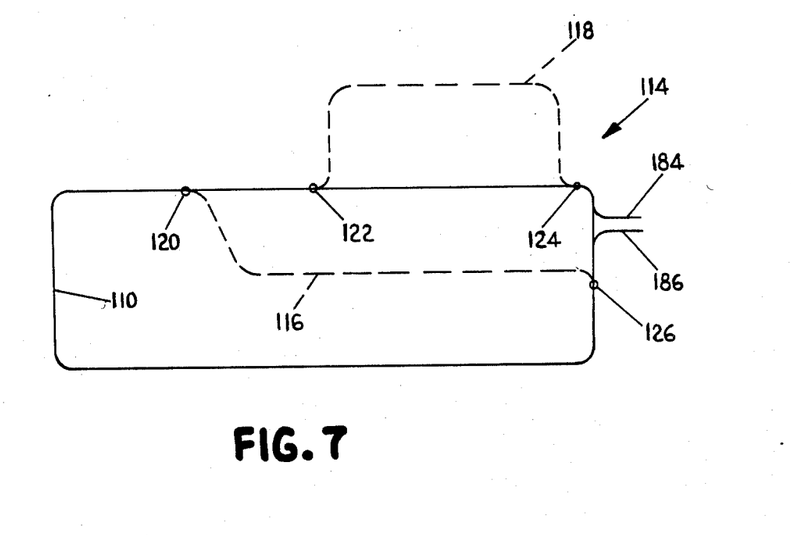
FIG. 7 depicts the separate guidepath layouts for a vehicle guidance system employing frequency discrimination.

The complications relating to guidepath layouts are illustrated in FIG. 7, which shows a buried magnetic-field implementation of the guidepath network 114 shown in FIG. 2. In the magnetic-field layout implementation, the outer loop of the guidepath 114, which comprises guideline 110, is a loop which can begin at outer loop termination 184 and end at adjacent outer loop termination 186. Accordingly, the outer loop configuration can be readily accomplished, since the loop can begin and end at adjacent locations. Any requisite frequency driver necessary to form a completed loop can be connected without any substantial complication. However, in order to accomplish the "easiest" use of multiple frequencies, it would be necessary to make the signal frequency on guideline 118 and the signal frequency on guideline 116 common to the signal frequency on guideline 110. Accordingly, to create the loop between terminal connection 122 and terminal connection 124, the guideline loop's frequency must be common with that of the loop beginning at termination 184 and ending at termination 186. Similarly, to create the loop between terminal locations 120 and 126, it would be necessary for the frequency of such loop signal to also be common to the signal frequency of the outer loop beginning at termination 184 and ending at termination 186.

To explain a vehicle guidance system in accordance with the invention, it should be noted that in the world of physics principles, most physical phenomena comprise "dual" phenomena. One example of such dual phenomena is the action of voltage and current in inductive and capacitive reactances. Early in their educational careers, every electrical engineering student, for example, learns that in an inductive circuit, the voltage is made to lead current, while in a capacitive circuit, the current is made to lead the voltage.

In the case of utilizing vehicle guidance systems employing wire guidelines, if a vehicle can be made to follow a magnetic field generated through the current flowing through an electrical conductor, then it should also be true that a vehicle can be made to follow an electric field existing as a result of a voltage impressed on the electrical conductor.

Figure 8:
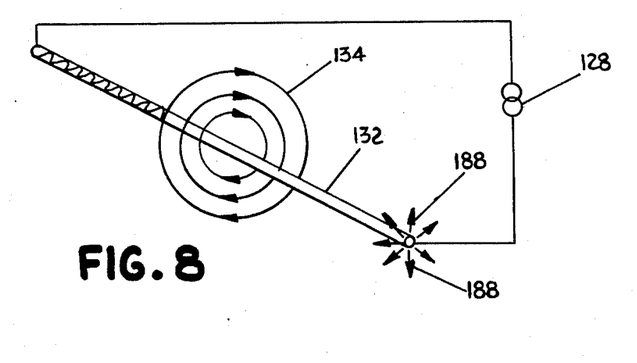
FIG. 8 depicts the general principles of the generation of an electrical field resulting from application of a voltage to a conductor.

This concept in accordance with the invention is referred to herein as the concept of a "buried electric-field" wire, and is shown best in principle with respect to FIG. 8. As shown in FIG. 8, the voltage source 128 is utilized to impress upon the conductor 132 a voltage. The resistance of conductor 132 causes a current to exist in the connector which also generates the magnetic lines of force 134. However, as a result of the voltage impressed on conductor 132, and the subsequent drop in voltage along its length, lines of electrical force 188 are generated in a radial direction relative to the conductor 132. For typical conductors and voltage signals, the magnetic field is relatively easily detected. However, the electric field consisting of the electric lines of force 188 for a typical conductor can be somewhat small and relatively difficult to detect. One reason for this difficulty is that the electrical field will exist only at certain locations along the axial length of the conductor 132.

Figure 9:
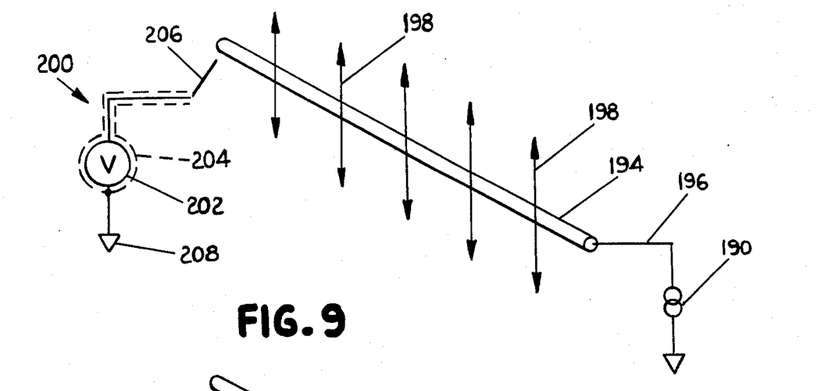
FIG. 9 depicts the general principles of measuring the electrical field generated through the conductor shown in FIG. 8.

However, as shown in FIG. 9, it is possible to excite a conductor 194 with a relatively large voltage source 190 having one terminal connected to an earth ground 192. The conductor 194 is connected to the other terminal of the large voltage source 190 through the lead 196. As apparent from the representative diagram of FIG. 9, and for generation of the electrical lines of force 198 as detected by voltage probe 200 it is unnecessary for the conductor 194 to have a return conductive path connection to the voltage source 190. With the configuration representatively shown in FIG. 9, and with the conductor 194 excited with a voltage relative to the surrounding environment, namely earth ground, the opposite relationship between the magnetic fields and electric fields from that previously described will be the case. That is, the magnetic field will typically be relatively small, while the electric lines of force 198 will be relatively large with respect to the earth ground.

As further shown in FIG. 9, while a magnetic field can be detected by magnetic circuitry comprising sensing coils or the like as previously described herein, the electrical lines of force 198 can be detected by means of a voltage probe such as probe 200 depicted in FIG. 9. As shown therein, the voltage probe 200 includes a volt meter 202 having shielding 204. One probe terminal 206 is selectively brought into proximity to the conductor 194, while an opposing probe terminal is secured to earth ground 208. It will be apparent that as in the case of magnetic fields, the electrical lines of force 198 will also alternate in polarity when the relatively large voltage source 190 is of the AC type.

Figure 10:
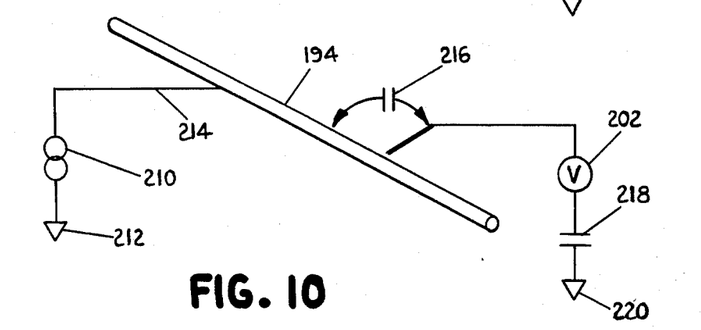
FIG. 10 depicts the equivalent circuit for the measurement of electrical field that is shown in FIG. 9.

Although FIG. 9 is a representative diagram of an idealistic measurement of electrical field, in a physically realizable circuit of the type shown in FIG. 9, with the electrical lines of force 198 measured with respect to the earth's potential, it will be necessary for the electric field to be detected by means of a probe referenced to a conductor having a relatively large capacitance with respect to earth ground. A representative diagram of this type of circuit arrangement is shown in FIG. 10. As depicted therein, an AC voltage source 210 referenced to an earth ground 212 is utilized to excite a conductor 194 with a voltage applied through lead 214. A voltage probe is shown as comprising the voltmeter 202 having a probe terminal associated with the conductor 194 through a capacitance 216. Correspondingly, a series-connected capacitance 218 is shown as existing between the opposing terminal of the voltmeter 202 and the earth ground 220. What is necessary to provide a physically realizable application of this concept is that the capacitance to earth ground 218 is several times larger than the series capacitance 216. In accordance with the invention, this relatively large capacitance 218 can be provided by means of the large conducting surface area of the vehicle base 104 of the vehicle 102 shown in FIG. 1.

Figure 11:
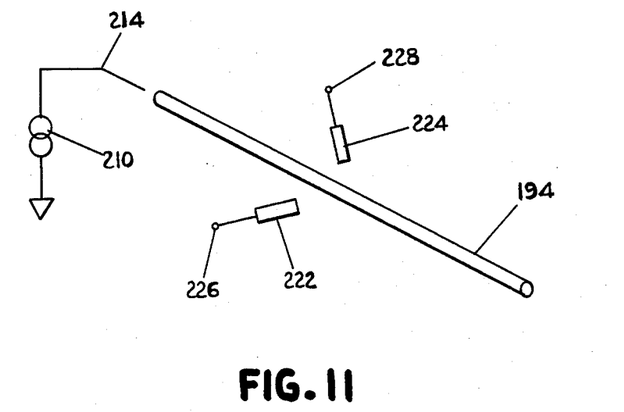
FIG. 11 depicts the position of voltage probes which can be associated with a vehicle for measurement of the electrical field of the conductor shown in FIG. 10.

Further in accordance with the invention, and as shown in FIG. 11, the buried electrical field system employs a conductive wire 194 buried within the floor surface and comprising a part of the guidepath layout 114 previously described herein. Mounted to the vehicle in place of the previously described sensing coils, comprising first and second detectors 138, 140, is a pair of electrical field detectors comprising voltage probes 222 and 224 having output terminals 226 and 228, respectively. These voltage probes 222, 224 would have a configuration and function as previously described herein with respect to voltage probe 200. These voltage probes 222 and 224 can thus be characterized as electrical field sensors.

Figure 12:
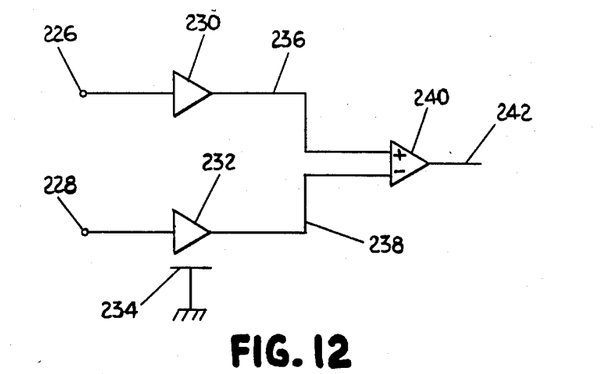
FIG. 12 is a simplified block diagram showing circuitry for generating a steering error signal responsive to the electrical field measured through the voltage probes shown in FIG. 11; and, FIG. 13 is a block diagram showing the generation of a steering error signal utilizing the voltage probes shown in FIG. 11, with the circuitry comprising synchronous detection and automatic gain control.

The conductor 194 is excited by an AC voltage source 210 connected to the conductor 194 through lead 214. An opposing terminal of the voltage source 210 relative to the terminal connected to lead 214 would be reference to earth ground as also shown in FIG. 11. The voltage probes 222 and 224, comprising electric field detectors, would be utilized in the same manner as the previously-described first and second detectors 138, 140 to guide the associated vehicle in response to the relative signal strength determined between the two probes 222 and 224. As shown in FIG. 12, the electric field signals as indicated by the terminals 226, 228 from voltage probes 222, 224 could be applied directly as input signals to operational amplifiers 230 and 232. As also show in FIG. 12, the vehicle frame would operate as a ground connection forming a capacitance 234 so as to provide the capacitance 218 as previously described with respect to FIG. 10. The output signals of the operational amplifiers 230, 232 would be applied as input signals on lines 236, 238 to a differential amplifier 240.

The signal at the output of differential amplifier 240 on line 242 could be characterized as a steering error signal representative of the relative signal strength detected by the voltage probes 222 and 224. In accordance with the foregoing, the basic vehicle steering requirements would be provided by a means to detect the electric field along the conductor 194 through the voltage probes 222, 224.

With the implementation described above, the problems of path complication and layout complication as earlier described with respect to buried magnetic-field wire systems are substantially eliminated. That is, in a buried electric field system, all the wire segments therein are at one potential. In addition, such a system requires no unused " wire segments forming a loop as necessitated by current-carrying conductor systems. Elimination of the extra and non-functional wire segments will greatly simplify topological problems normally associated with buried wires. Also in the implementation described above, all of the wire segments comprising conductor 194 and further comprising a guidepath 114 need be energized at only one location, and further need be energized only by means of a single AC voltage source generator having a single frequency voltage signal.

It should also be noted that with regard to one of the problems of a buried magnetic-field wire system, namely wire breakage, there is a possibility that a wire type could be utilized in a buried electric-field system which would provide a relatively greater degree of physical flexibility. This possibility exists because the ohmic resistance of a buried electric-field wire system's guidepath network can be relatively higher than that which may exist in a buried magnetic-field wire system. Accordingly, this lack of a substantial restriction on ohmic resistance would allow the wire to be constructed of a conductive but flexible material, such as materials including carbonized rubber or the like.

It can also be noted that in order to provide a steering error signal having a relatively greater reliability with reduction of spurious, unwanted signals existing from environmental conditions and the like, a synchronous detection and automatic gain control system 244 can be utilized as shown in FIG. 10. As shown therein, the signals generated by the voltage probes 222 and 224 are applied on lines 226 and 228 to the operational amplifiers 230 and 232, respectively. The output signal of the operational amplifier 230 is applied through a multiplier circuit 246. An input to the multiplier circuit 246 is supplied by the reference oscillator 248. The resultant mixed signal can be applied as an input to low pass filter 250. Similarly, the voltage probe signal from probe 224 can be applied on line 228 through the operational amplifier 232, with the resultant output applied as an input signal to another multiplier 246, also having as an input signal the signal generated by reference oscillator 248. The output signal from this multiplier circuit 246 is applied as an input signal to the low pass filter 252. The output signal from low pass filter 250 is then further applied as an input signal to a positive terminal of the difference amplifier 240. Applied to the negative input terminal of difference amplifier 240 is the output signal of the low pass filter 252. The resultant signal generated by the differential amplifier 240 can be characterized as the steering error signal on line 242 as previously described.

Figure 13:
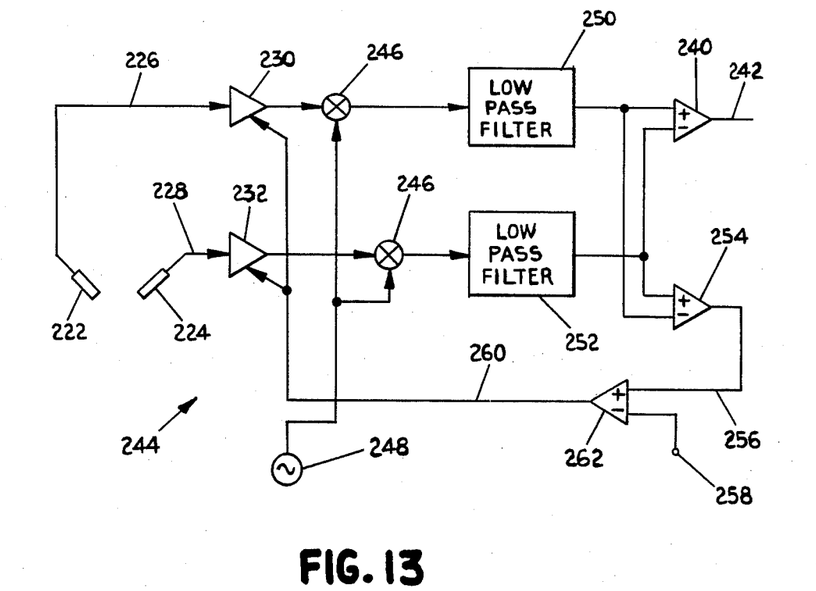

To provide synchronous detection and automatic gain control, the output signals from low pass filters 250 and 252 are also applied as input signals to the adder circuit amplifier 254. The output of the adder circuit amplifier 254 is applied on line 256 to the input of a positive terminal of the amplifier 262. Applied as an input to a negative input terminal of the differential amplifier 262 is a reference voltage on line 258. The differential output is applied on line 260 as an input to each of the operational amplifiers 230 and 232. In this manner, automatic gain control is provided for the system generating the steering error signal on line 242 in response to the signals sensed by the voltage probes 222 and 224.

In accordance with the foregoing, it should also be noted that is would be possible to provide actual communications signals through the conductors of the system. For example, data from a host computer could readily be impressed on the wire conductors, as could data from the vehicle. It should be further noted that in systems employing digital techniques to sense the position of the vehicle relative to the guidepath, such a system could be utilized in combination with the buried electric-field wire system by adding additional probes and detectors. That is, the sensor circuit arrangement would necessarily be provided with additional data as to the relative electric field strengths at different positions across the wire conductor.

It will be apparent to those skilled in the pertinent arts that other embodiments of vehicle guidance systems in accordance with the invention can be designed. That is, the principles of a vehicle guidance system employing a buried electrical-field wire system are not limited to the specific embodiments described herein. Accordingly, it will be apparent to those skilled in the art that modifications and other variations of the above-described illustrative embodiments of the invention may be effected without departing from the spirit and scope of the novel concepts of the invention.

The embodiments of the invention in which an exclusive property or privilege is claimed are defined as follows:

1. An automated vehicle guidance system having one or more self-propelled vehicles adapted to follow a predetermined guidepath having path signal generating means for generating signals on said guidepath, and wherein each of said vehicles includes guidepath sensing means for sensing the position of the guidepath with respect to the vehicle, signal generating means connected to said sensing means for generating an intelligence signal representative of the position of the vehicle with respect to the guidepath, and control means for steering the vehicle in response to the intelligence signal generated by the signal generating means so as to maintain a given position of the vehicle with respect to the guidepath as the vehicle moves therealong, the improvement wherein:

the path signal generating means comprises means for exciting the guidepath with an AC voltage signal referenced to an earth ground;

the guidepath sensing means comprises electric field sensing means for sensing the strength of the electric field resulting from the voltage signal; and the signal generating means is connected to the electric field sensing means and is responsive to the sensed strength of the electric field for generating the intelligence signal.

2. An automated vehicle guidance system in accordance with claim 1 wherein the path signal generating means comprises an AC voltage source having one terminal connected to an earth ground and another terminal connected to a conductor on the guidepath.

3. An automated vehicle guidance system in accordance with claim 2 wherein the conductor. and the AC voltage source form a closed-loop electrical path only through capacitive coupling to the earth ground.

4. An automated vehicle guidance system in accordance with claim 1 wherein the guidepath sensing means comprises a pair of voltage probes mounted on the vehicle so that the relative strength of the electric field sensed by one of the probes is substantially different from the relative strength of the electric field sensed by the other probe only when the vehicle deviates from the given position with respect to the guidepath.

5. An automated vehicle guidance system in accordance with claim 4 wherein the guidepath sensing means further comprises means for providing capacitance between the voltage probes and the earth ground.

6. An automated vehicle guidance system in accordance with claim 5 wherein the vehicle includes a base having a relatively large conductive surface, and the surface provides the capacitance.

7. An automated vehicle guidance system in accordance with claim 4 wherein the signal generating means comprises means connected to the voltage probes for generating the intelligence signal as representative of the difference between signal strengths of the electric field as sensed by the voltage probes.

8. An automated vehicle guidance system in accordance with claim 7 wherein the signal generating means further comprises means to provide synchronous detection and automatic gain control of signals generated by the voltage probe and the steering error signal.

* * * * *